(12) United States Patent
Phillips

(10) Patent No.: US 9,488,458 B2
(45) Date of Patent: Nov. 8, 2016

(54) MEASURING DEVICE

(71) Applicant: Frank Phillips, Woodland, CA (US)

(72) Inventor: Frank Phillips, Woodland, CA (US)

( * ) Notice: Subject to any disclaimer, the term of this patent is extended or adjusted under 35 U.S.C. 154(b) by 90 days.

(21) Appl. No.: 14/504,856

(22) Filed: Oct. 2, 2014

(65) Prior Publication Data

US 2016/0097624 A1    Apr. 7, 2016

(51) Int. Cl.
| | |
|---|---|
| *B43L 7/027* | (2006.01) |
| *G01B 3/10* | (2006.01) |
| *B25H 7/02* | (2006.01) |
| *G01B 3/56* | (2006.01) |

(52) U.S. Cl.
CPC .............. *G01B 3/1084* (2013.01); *B25H 7/02* (2013.01); *G01B 3/563* (2013.01); *G01B 3/566* (2013.01); *G01B 2003/1048* (2013.01); *G01B 2003/1089* (2013.01); *G01B 2003/1092* (2013.01)

(58) Field of Classification Search
CPC ..................... G01B 3/1084; G01B 2003/1089
USPC .......... 33/415, 418, 420, 427, 428, 759, 760
See application file for complete search history.

(56) References Cited

U.S. PATENT DOCUMENTS

| | | | |
|---|---|---|---|
| 2,571,569 A * | 10/1951 | Greenwood | G01B 3/1084 33/484 |
| 5,077,910 A | 1/1992 | Smith | |
| 5,481,810 A | 1/1996 | Hastings et al. | |
| 5,894,675 A | 4/1999 | Cericola | |
| D428,348 S | 7/2000 | Hatfield et al. | |
| 6,178,655 B1 | 1/2001 | Potter et al. | |
| 6,230,416 B1 * | 5/2001 | Trigilio | B43L 7/027 33/451 |
| 6,598,311 B2 | 7/2003 | Noon | |
| 8,276,285 B1 * | 10/2012 | Bennett | B43L 1/00 33/429 |
| 2004/0172840 A1 | 9/2004 | Odachowski | |
| 2004/0172846 A1 * | 9/2004 | McRae | G01B 3/1041 33/760 |
| 2007/0074413 A1 | 4/2007 | Neuroth | |
| 2009/0260244 A1 | 10/2009 | Carbone, Jr. | |
| 2010/0139106 A1 * | 6/2010 | Atwood | B25H 7/00 33/418 |

* cited by examiner

*Primary Examiner* — G. Bradley Bennett

(57) ABSTRACT

A measuring assembly for quickly and accurately marking a member for cutting includes a squaring tool to mark the member at a selected point. A tape measure is coupled to the squaring tool. Thus, the tape measure is always available to a user while the user utilizes the squaring tool. The tape measure measures a distance on the member such that the member may be quickly and accurately marked for cutting.

7 Claims, 4 Drawing Sheets

MEASURING DEVICE

BACKGROUND OF THE DISCLOSURE

Field of the Disclosure

The disclosure relates to measuring devices and more particularly pertains to a new measuring device for quickly and accurately marking a member for cutting.

SUMMARY OF THE DISCLOSURE

An embodiment of the disclosure meets the needs presented above by generally comprising a squaring tool to mark a member at a selected point. A tape measure is coupled to the squaring tool. Thus, the tape measure is always available to a user while the user utilizes the squaring tool. The tape measure measures a distance on the member such that the member may be quickly and accurately marked for cutting.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
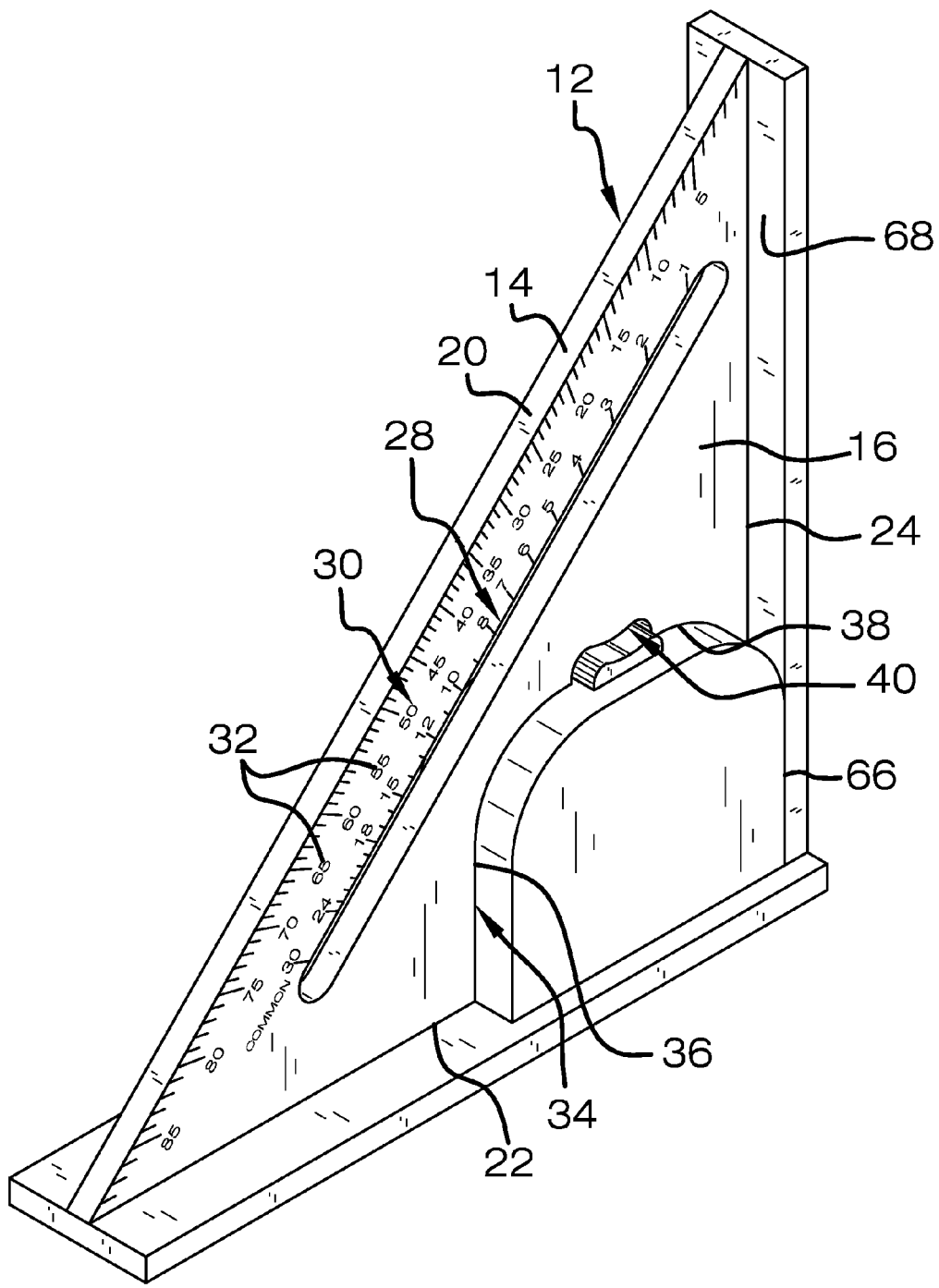
FIG. 1 is a right side perspective view of a measuring assembly according to an embodiment of the disclosure.
Figure 2:
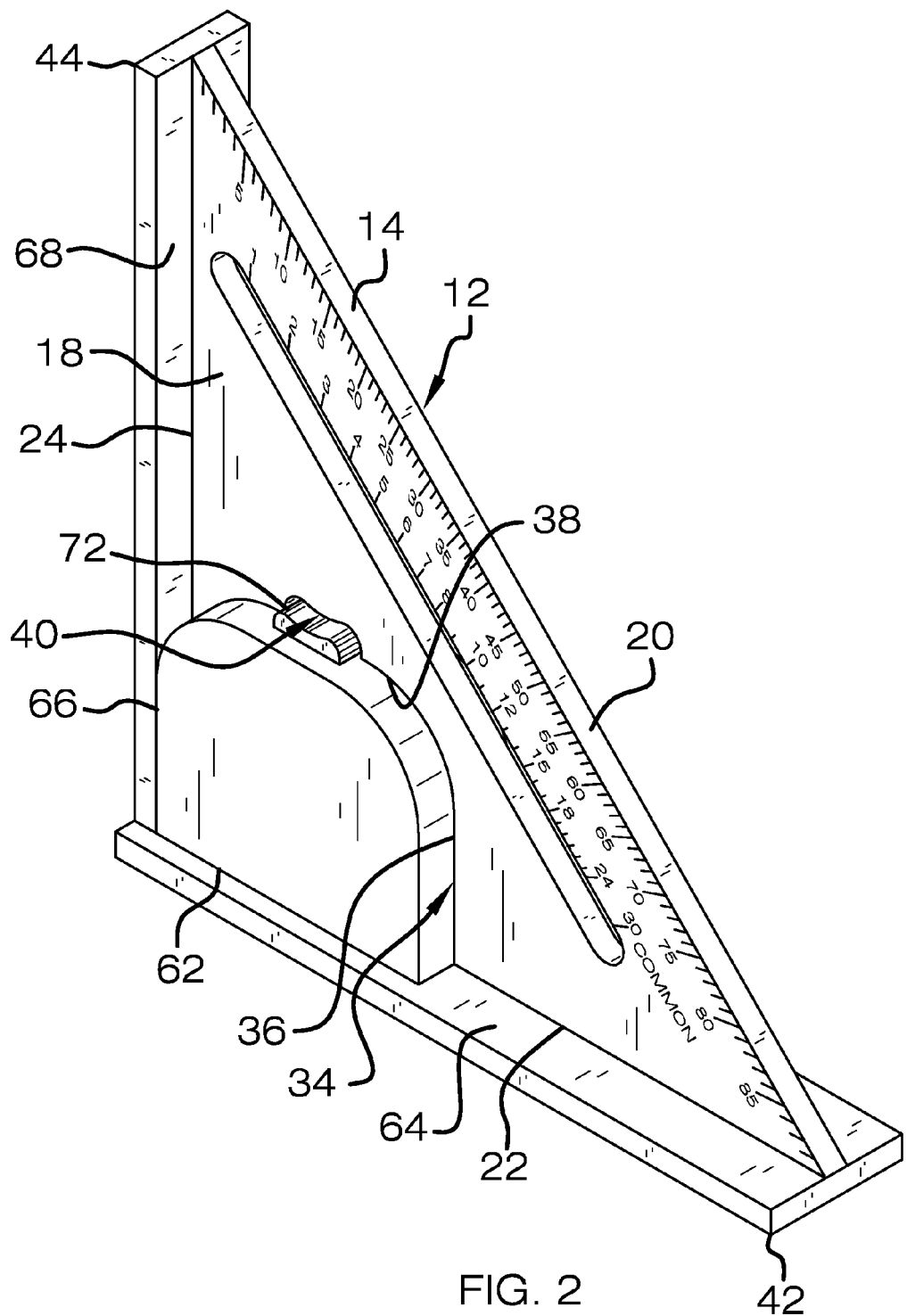
FIG. 2 is a left side perspective view of an embodiment of the disclosure.
Figure 3:
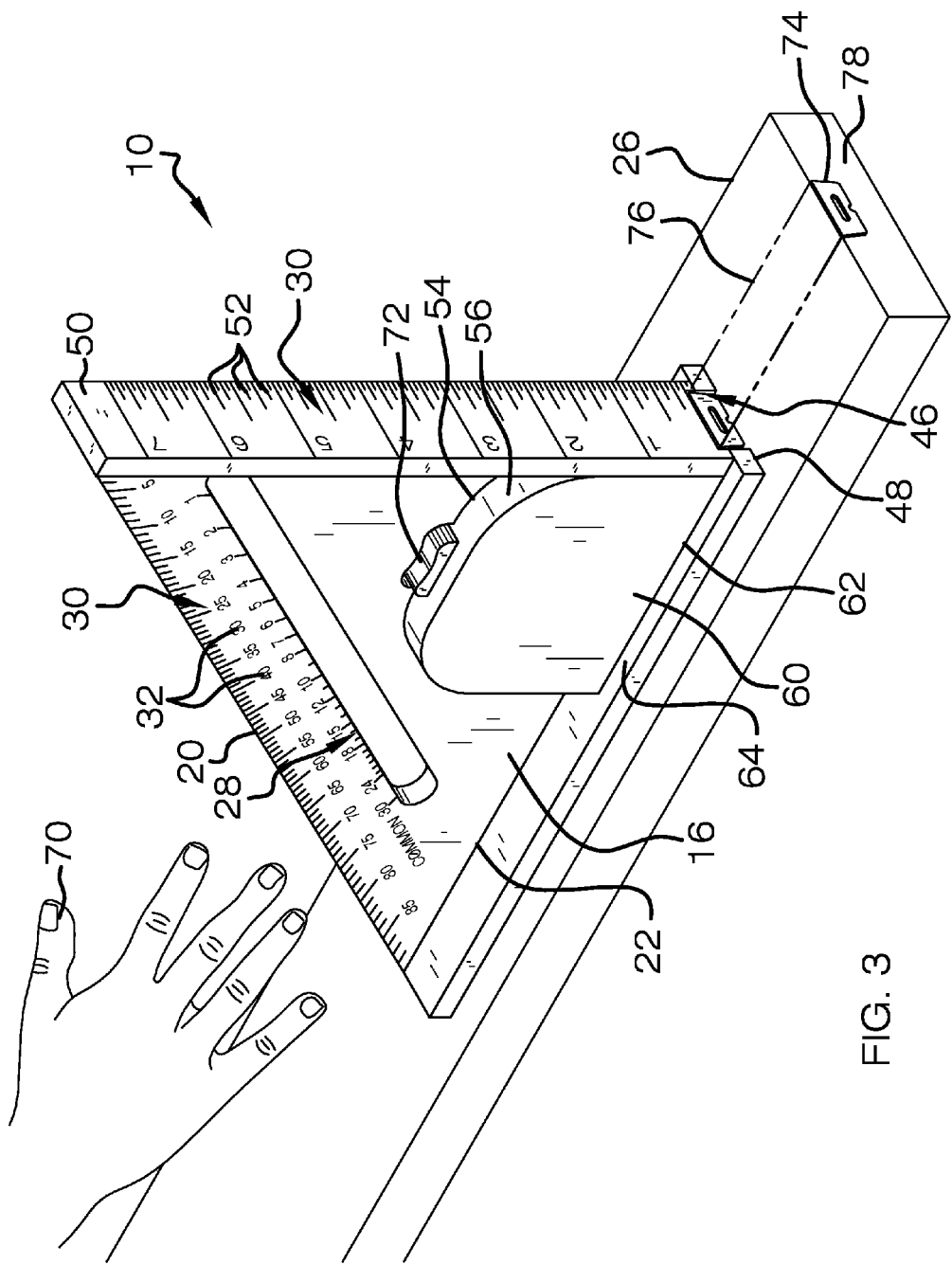
FIG. 3 is a front perspective view of an embodiment of the disclosure.
Figure 4:
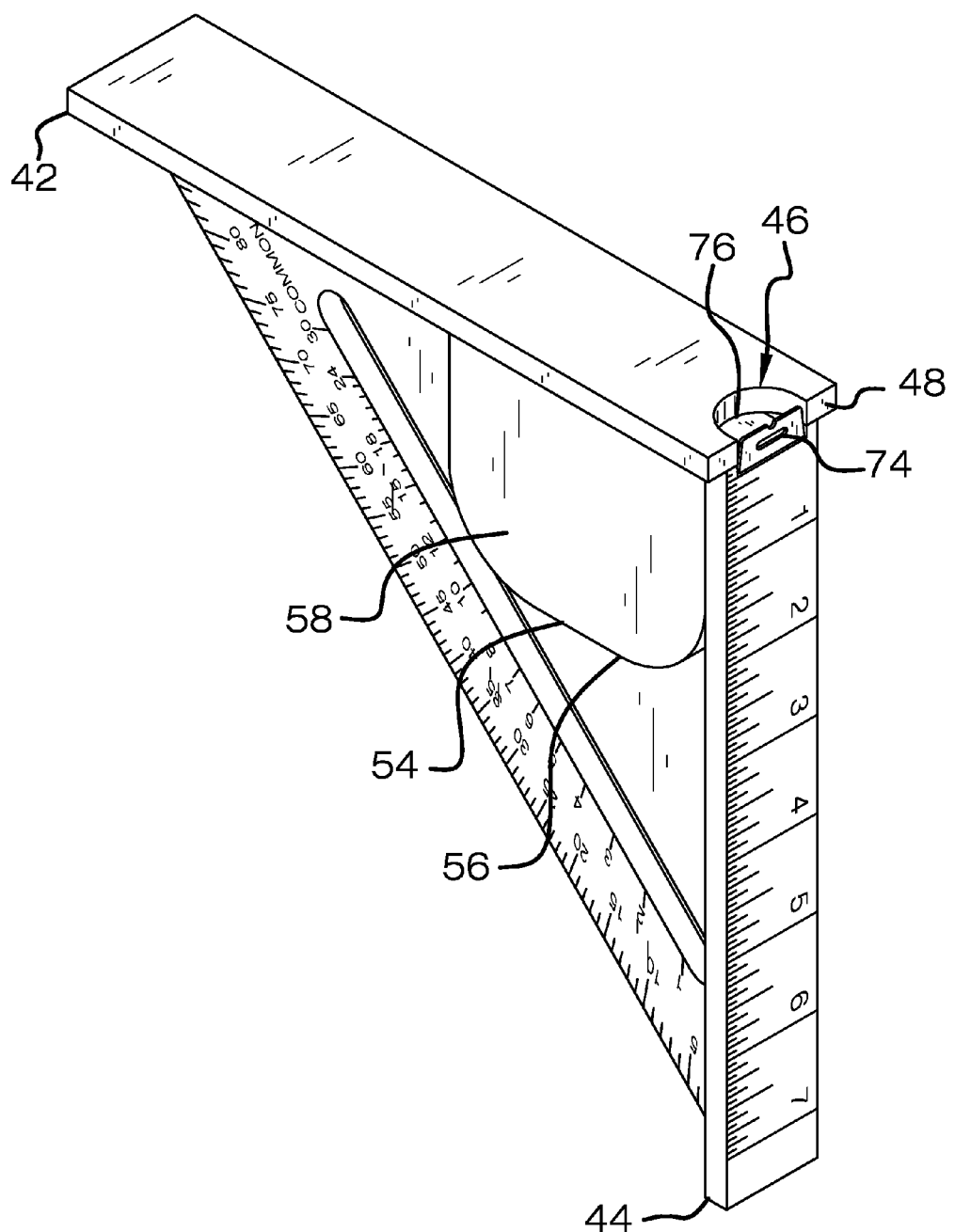
FIG. 4 is a bottom perspective view of an embodiment of the disclosure.

With reference now to the drawings, and in particular to FIGS. 1 through 4 thereof, a new measuring device embodying the principles and concepts of an embodiment of the disclosure and generally designated by the reference numeral 10 will be described.

As best illustrated in FIGS. 1 through 4, the measuring assembly 10 generally comprises a squaring tool 12. The squaring tool 12 has an outer edge 14 extending between each of a first lateral side 16 and a second lateral side 18 of the squaring tool 12. A hypotenuse side 20 of the outer edge 14 extends between each of a bottom side 22 and a front side 24 of the outer edge 14. Thus, the squaring tool 12 forms an isosceles right triangle wherein the squaring tool 12 may be utilized to mark a member 26 at a selected point. The member 26 may be a length of lumber or the like. Additionally, the squaring tool 12 may be a framing square or the like.

The squaring tool 12 has groove 28 extending through the first 16 and second 18 lateral sides. The groove 28 is positioned adjacent to the hypotenuse side 20 of the outer edge 14. Additionally, the groove 28 extends between the front 24 and bottom 22 sides of the outer edge 14. Indicia 30 are printed on each of the first 16 and second 18 lateral sides. The indicia 30 are positioned between the hypotenuse side 20 of the outer edge 14 and the groove 28. The indicia 30 comprise numerals 32 indicating common lengths related to structural framing.

The squaring tool 12 has an opening 34 extending through each of the first 16 and second 18 lateral sides. A bounding edge 36 of the opening 34 extends upwardly from the bottom side 22 of the outer edge 14 and rearwardly from the front side 24 of the outer edge 14 such that the opening 34 is positioned at an intersection of the front 24 and bottom 22 sides. An uppermost side 38 of the bounding edge 36 defines a lock portion of the opening 40. The lock portion of the opening 40 is centrally positioned on the uppermost side 38 of the bounding edge 36.

The squaring tool 12 has a first panel 42 and a second panel 44. Each of the first 42 and second 44 abutting panels is coupled to and is coextensive with an associated one of the bottom 22 and front 24 sides of the outer edge 14. Each of the first 42 and second 44 abutting panels extends laterally away from each of the first 16 and second 18 lateral sides. A selected one of the first 42 and second 44 abutting panels abuts the member 26 when the squaring tool 12 is positioned to mark the member 26 at the selected point.

The squaring tool 12 has a slot 46 extending rearwardly into a first end 48 of the first panel 42 such that the slot 46 intersects with the opening 34. Indicia 30 are printed on a forwardmost side 50 of the second panel 44. The indicia 30 are distributed along an entire length of the second panel 44. The indicia 30 comprise marks 52 indicating distance in $\frac{1}{32}$ inch increments.

A tape measure 54 is provided. The tape measure 54 has an exterior edge 56 extending between each of a first oblique side 58 and a second oblique side 60 of the tape measure 54. The tape measure 54 is positioned within the opening 34 such that a lowermost side 62 of the exterior edge 56 abuts a top side 64 of the first panel 42 and a frontmost side 66 of the exterior edge 56 abuts a back side 68 of the second panel 44. Thus, the tape measure 54 is always available to a user 70 while the user 70 utilizes the squaring tool 12.

A lock 72 on the tape measure 54 is positioned within the lock portion of the opening 40. A tip 74 of a tape 76 of the tape measure 54 is positioned within the slot 46. The tape 76 is extendable forwardly from the slot 46 wherein the tape measure 54 may measure a distance on the member 26. Thus, the member 26 may be quickly and accurately marked for cutting.

In use, the tip 74 of the tape 76 is positioned to engage an end 78 of the member 26. The squaring tool 12 is moved along the member 26 and positioned at a selected distance from the end 78 of the member 26. The member 26 is marked at the selected distance. Additionally, the member 26 is cut or otherwise manipulated in the convention of structural framing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A measuring assembly comprising:
   a squaring tool configured to mark a member at a selected point, said squaring tool having an outer edge extending between each of a first lateral side and a second lateral side of said squaring tool, a hypotenuse side of said outer edge extending between each of a bottom side and a front side of said outer edge such that said squaring tool forms an isosceles right triangle;
   a groove extending through said first and second lateral sides of said squaring tool, said groove being positioned adjacent and parallel to said hypotenuse side of said outer edge; and
   a tape measure coupled to said squaring tool such that said tape measure is always available to a user while the user utilizes said squaring tool, said tape measure being configured to measure a distance on the member such that the member may be quickly and accurately marked for cutting.

2. The assembly according to claim 1, further comprising said squaring tool having an opening extending through each of said first and second lateral sides.

3. The assembly according to claim 2, further comprising a bounding edge of said opening extending upwardly from said bottom side of said outer edge and rearwardly from said front side of said outer edge such that said opening is positioned at an intersection of said front and bottom sides of said outer edge.

4. The assembly according to claim 3, further comprising said squaring tool having a first panel and a second panel each being coupled to and being coextensive with an associated one of said bottom and front sides of said outer edge, each of said first and second panels extending laterally away from each of said first and second lateral sides.

5. The assembly according to claim 4, further comprising said squaring tool having a slot extending rearwardly into a first end of said first panel such that said slot intersects with said opening.

6. The assembly according to claim 5, further comprising said tape measure having an exterior edge extending between each of a first oblique side and a second oblique side of said tape measure, said tape measure being positioned within said opening such that a lowermost side of said exterior edge abuts a top side of said first panel and a frontmost side of said exterior edge abuts a back side of said second panel, a tip of a tape of said tape measure being positioned within said slot such that said tape is extendable forwardly from said slot.

7. A measuring assembly comprising:
   a squaring tool, said squaring tool having an outer edge extending between each of a first lateral side and a second lateral side of said squaring tool, a hypotenuse side of said outer edge extending between each of a bottom side and a front side of said outer edge such that said squaring tool forms an isosceles right triangle wherein said squaring tool is configured to mark a member at a selected point;
   said squaring tool having an opening extending through each of said first and second lateral sides, a bounding edge of said opening extending upwardly from said bottom side of said outer edge and rearwardly from said front side of said outer edge such that said opening is positioned at an intersection of said front and bottom sides of said outer edge;
   said squaring tool having a first panel and a second panel each being coupled to and being coextensive with an associated one of said bottom and front sides of said outer edge, each of said first and second panels extending laterally away from each of said first and second lateral sides;
   said squaring tool having a slot extending rearwardly into a first end of said first panel such that said slot intersects with said opening;
   a groove extending through said first and second lateral sides of said squaring tool, said groove being positioned adjacent and parallel to said hypotenuse side of said outer edge;
   a tape measure, said tape measure having an exterior edge extending between each of a first oblique side and a second oblique side of said tape measure, said tape measure being positioned within said opening such that a lowermost side of said exterior edge abuts a top side of said first panel and a frontmost side of said exterior edge abuts a back side of said second panel wherein said tape measure is always available to a user while the user utilizes said squaring tool; and
   a tip of a tape of said tape measure being positioned within said slot such that said tape is extendable forwardly from said slot wherein said tape measure is configured to measure a distance on the member such that the member may be quickly and accurately marked for cutting.

* * * * *